J. RIGBY.
Car-Wheel.

No. 218,453.   Patented Aug. 12, 1879.

WITNESSES:
T. S. West
V. L. West

INVENTOR:
JAMES RIGBY,
BY H. W. Beadle & Co.
ATTYS

UNITED STATES PATENT OFFICE.

JAMES RIGBY, OF MONTREAL, QUEBEC, CANADA.

IMPROVEMENT IN CAR-WHEELS.

Specification forming part of Letters Patent No. 218,453, dated August 12, 1879; application filed June 3, 1879.

*To all whom it may concern:*

Be it known that I, JAMES RIGBY, of Montreal, Canada, have invented a new and Improved Car-Wheel; and I hereby declare the following to be a full, clear, and exact description of the same, reference being had to the accompanying drawings, and to the letters of reference marked thereon.

This invention is a car-wheel having a metal body and a vulcanized-fiber tire, the same constituting a new article of manufacture, fully described hereinafter.

Figure 1:
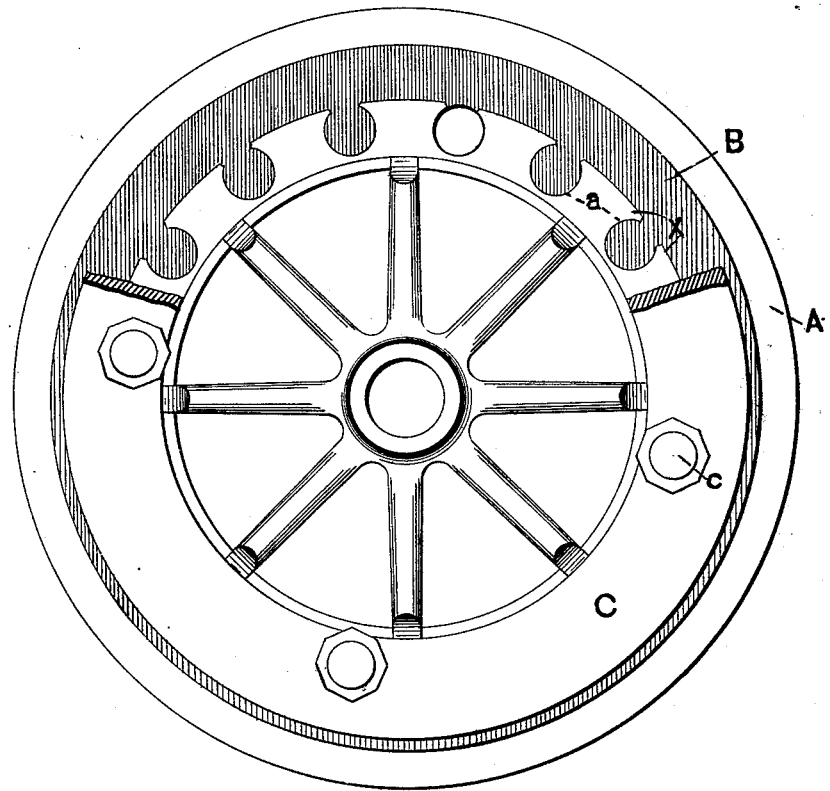
Figure 2:
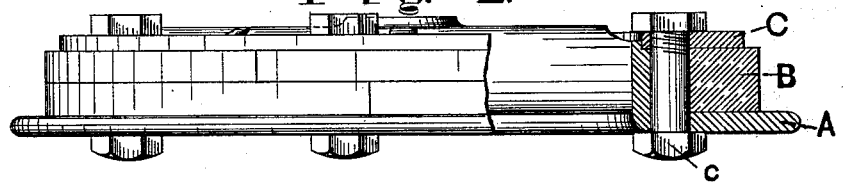
Figures 3, 4:
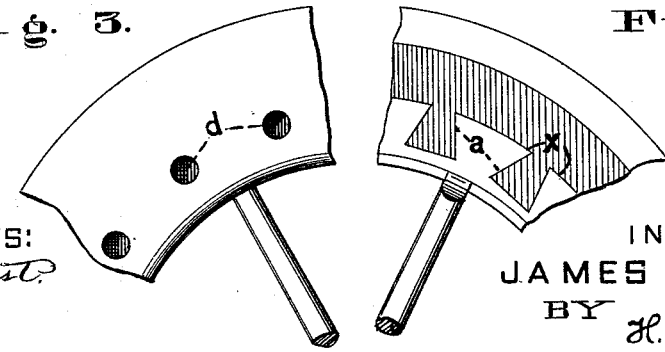

In the drawings, Figure 1 represents a plan view of my improved wheel; Fig. 2, a side elevation, partially in section; Fig. 3, a partial plan view of the front face, and Fig. 4 a section of a modified form.

A, Figs. 1 and 2, represents a metal car-wheel body, constructed generally in any proper manner, but preferably provided with peripheral recesses a, Figs. 1 and 4, of any proper form, having overhanging portions x, as shown.

B, Figs. 1 and 2, represents a tire of vulcanized fiber, the inner circumferential face of which is made to correspond with the outer circumferential face of the body of the wheel, as shown. C represents a clamping-ring, and c c bolts or rivets, by means of which the tire is supported. d d, Fig. 3, represent holes in the body of the wheel, through which an instrument may be inserted to force off the tire when desired.

When these parts are properly united, as shown in Fig. 1, a wheel is obtained which possesses the following advantages:

The body of the wheel and the tire constitute a single solid structure, which has a rigid internal portion and a slightly-elastic outer portion, the latter possessing the quality of great durability. The outer portion also is capable of receiving the impact of a blow without giving forth much sound. By means of the overhanging portions x, the slightly-elastic vulcanized fiber is securely anchored to the metal body.

The method of making this wheel is substantially as follows: The body of the wheel is first cast, in the usual well-known or any other proper manner, with suitable peripheral recesses. The vulcanized fiber, having been first formed into blocks, sheets, or rings, is then sawed upon its outer face into proper shape to form the circumference of the tire, and on its inner face into proper shape to engage with the recesses of the body of the wheel. The two parts thus formed are then united by placing one over the other in proper position, and by forcing the projections of one into the recesses of the other.

The tire may be made in sections, if desired. I do not limit myself to any particular form of recesses for uniting the outer circumferential face of the tire to the inner circumferential face of the body of the wheel.

Having thus described my invention, what I claim as new, and desire to secure by Letters Patent, is—

A car-wheel having a metal body and vulcanized-fiber tire, the metal body having recesses a, with overhanging portions x, and the tire corresponding projections, as described.

This specification signed and witnessed this 3d day of June, 1879.

JAMES RIGBY.

Witnesses:
 CORNELIUS COX,
 THEODORE S. WEST.